United States Patent [19]

Wyner

[11] 4,227,250
[45] Oct. 7, 1980

[54] MINIMIZATION OF EXCESS BANDWIDTH IN PULSE AMPLITUDE MODULATED DATA TRANSMISSION

[75] Inventor: Aaron D. Wyner, Maplewood, N.J.
[73] Assignee: Bell Telephone Laboratories, Incorporated, Murray Hill, N.J.
[21] Appl. No.: 959,086
[22] Filed: Nov. 9, 1978
[51] Int. Cl.³ ............................................. H04L 3/00
[52] U.S. Cl. ...................................... 375/37; 370/19; 370/21; 375/58
[58] Field of Search .......... 179/15 BC, 15.55, 15 BW; 375/37, 38, 58; 370/19, 21; 364/514; 340/203, 204, 347 DD

[56] References Cited

U.S. PATENT DOCUMENTS

| | | | |
|---|---|---|---|
| 2,537,843 | 6/1951 | Meacham | 250/27 |
| 3,388,330 | 6/1968 | Kretzmer | 325/42 |
| 3,522,383 | 6/1970 | Chang | 179/15 BC |
| 3,678,204 | 7/1972 | Harmuth | 179/15 BC |
| 3,705,981 | 12/1972 | Harmuth | 179/15 BC |
| 3,883,767 | 9/1974 | Wolf | 179/15 BC |
| 4,001,563 | 1/1977 | Biel-Charreton et al. | 179/15 BC |
| 4,001,564 | 1/1977 | Biel-Charreton et al. | 179/15 BC |

OTHER PUBLICATIONS

Harmuth, IEEE Tr. Info., May 1968, vol 1T-14, No. 3.
Schreiber, App. Walsh Functions, 1970 Proceedings, pp. 46-49.
Enomoto, App. Walsh Functions, 1971, Proceedings, pp. 11-17.
HUM/u/ bner, suprz, pp. 180-191.
Robinson, suprz, pp. 199-202.
Gethoffer, Applications of Walsh Functions, 1973 Proceedings, pp. 194-201.

*Primary Examiner*—Benedict V. Safourek
*Attorney, Agent, or Firm*—Peter A. Businger; Peter V. D. Wilde

[57] ABSTRACT

Pulse amplitude modulated data systems typically utilize linear combinations of Nyquist pulses to transmit data signals. Ideally, required bandwidth for the transmitted signal is $1/(2T)=\rho/2L$ where $\rho$ is the data rate, T the signaling interval, and L the number of bits per signal. In practice, however, an "excess bandwidth" of at least 10-20 percent is required.

According to the invention, data signals are encoded to produce an encoded signal which can be transmitted over a communications channel having excess bandwidth of merely 2-4 percent. The encoding scheme utilizes linear combinations of characteristic sequences which are known as discrete prolate spheroidal sequences. A transmitter and a corresponding receiver are disclosed.

16 Claims, 5 Drawing Figures

MINIMIZATION OF EXCESS BANDWIDTH IN PULSE AMPLITUDE MODULATED DATA TRANSMISSION

TECHNICAL FIELD

The invention is concerned with data transmission over bandlimited communications channels.

BACKGROUND OF THE INVENTION

Transmission channels such as, e.g., telephone connections, microwave systems, and radio links are subject to a variety of frequency dependent intrinsic impairments or extraneous disturbances. For example, in a voiceband telephone channel, impairments such as amplitude attenuation and phase distortion are relatively low at frequencies in the range of approximately 0.4–2.8 kHz but exhibit rapid increase at frequencies below and above this range. Consequently, in order to avoid undue distortion of signals during passage through a telephone channel, transmission of voice or data preferably is limited to frequencies in a suitably restricted range.

While restriction of frequency range is virtually mandated by inherent physical limitations of the typical telephone channel, such restriction may be used to economic advantage in systems which are physically less severely limited. For example, in a microwave or optical communications system, so-called frequency division multiplexing permits the simultaneous operation of several communications channels over one and the same physical facility when non-overlapping portions of the available spectrum are assigned to different communications channels. It is evident that minimization of frequency range assigned to individual channels may lead to an increase in the number of multiplexed channels.

In the case of data communications, there is an additional and paramount concern with transmission rate as limited by bandwidth. From the theoretical work of H. Nyquist it is well known that, in order to transmit numbers at a rate $p$ per second by pulse amplitude modulation, bandwidth of at least $p/2$ Hertz is required. Moreover, use of such minimal bandwidth, conveniently designated Nyquist bandwidth, depends on a number of idealizing assumptions regarding pulse shape and channel properties whose physical implementation is not practical. Pulse shape, in particular, is ideally required to have a perfectly rectangular spectrum of constant nonzero amplitude for frequencies within the frequency band and constant zero amplitude for frequencies outside the band. Such ideal spectrum corresponds to a pulse of the form $(\sin x)/x$ which may be approximated but not exactly realized in practice.

Physically realizable pulses which are suitable for pulse amplitude modulation are shown, e.g., in the book by R. W. Lucky et al., "Principles of Data Communications", McGraw-Hill, 1968 on page 51, in the book by William R. Bennett et al., "Data Transmission", McGraw-Hill, 1965 on page 56, and in U.S. Pat. No. 2,719,189 (issued on Sept. 27, 1955 to W. R. Bennett et al., "Prevention of Interpulse Interference in Pulse Multiplex Transmission"). Such pulses are characterized by a frequency spectrum which has a frequency interval in which amplitude is a nonzero constant and a so-called roll-off interval of frequencies at which amplitude decreases to zero smoothly and symmetrically with respect to the halfway point. Resulting pulses are known as Nyquist pulses and, at the price of additional bandwidth, are actually superior for purposes of data transmission based on pulse amplitude modulation. An often used Nyquist pulse is the so-called raised cosine pulse shown in the references cited above.

In a conventional pulse amplitude modulated data transmission system, data symbols $a_j$ having $2^L$ values or levels are represented by pulses whose amplitude at time $jT$ is directly proportional to $a_j$, $T$ being a fixed time interval between pulses transmitted. For example, if $L=1$, then, typically, the $a_j$'s are $+1$ or $-1$. Since the resulting signal is a linear combination of time translates of a single pulse, the bandwidth of the signal is equal to the bandwidth of the pulse which, ideally, can be as narrow as $1/(2T)$. However, due to roll-off as described above, an "excess bandwidth" of at least 10–20 percent is required in practice. In the case of a telephone channel, for example, transmission can be achieved at a rate of $9.6 \times 10^3$ bits/second using 4-level pulse amplitude modulated signals and corresponding to an ideal bandwidth of 2.4 kHz. However, allowing for 12 percent excess bandwidth, the transmitted signal occupies a frequency range which extends from approximately 0.36 to approximately 3.05 kHz.

While it is possible to transmit data items $a_j$ one at a time, actual transmission systems often use some form of data encoding based on groups of a fixed number $\nu$ of data items. For example, a simple encoding scheme used in error detection consists in forming the sum (modulo 2) of a block of $\nu$ binary data items and appending it as an $(n+1)$-st item to the block. Thus, for each $\nu$ data items, $N=\nu+1$ signals are transmitted and, at the expense of a slight reduction in data rate, information is supplied to the receiver which allows the detection of a transmission error.

Encoding may be used for purposes other than error detection such as, for example, to convert a 2-level signal into a 3-level signal in duobinary systems disclosed on pages 83–88 of the book by Lucky et al. cited above. Also, according to U.S. Pat. No. 3,388,330 (issued June 11, 1968 to E. R. Kretzmer) and as described on pages 88–92 of the book by Lucky et al., encoding may be used to achieve desirable frequency characteristics in so-called partial response systems.

SUMMARY OF THE INVENTION

The invention is a method for encoding blocks of multilevel data signals so as to minimize excess bandwidth required to transmit the encoded signal over a transmission channel such as, e.g., a telephone, radio, microwave, or optical communications channel. According to the invention, a block of $\nu$ data signals is encoded into a larger number $N$ of signals which are obtained as a linear combination of $\nu$ characteristic sequences known as discrete prolate spheroidal sequences. By judicious choice of $N$, $\nu$, and an additional parameter $W$, excess bandwidth is reduced to less than 10 percent and may be as low as 2–4 percent. As a result of such minimization, fidelity of transmission over bandlimited channels is enhanced and/or the number of frequency-division multiplexed channels is maximized.

DETAILED DESCRIPTION

It is a purpose of the invention to provide encoding and corresponding decoding techniques for use in pulse amplitude modulated data transmission systems. The encoding technique may be motivated by the desire to minimize excess bandwidth in situations where 10–20 percent excess bandwidth of conventional methods is considered excessive. Conversely, the aim may be to maximize data rate $\rho$ for prescribed bandwidth F.

Figure 1:
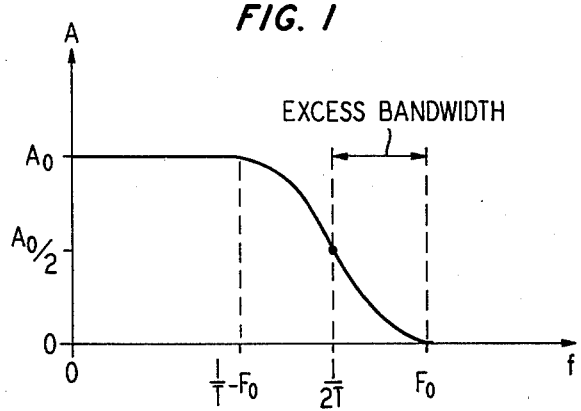
FIG. 1 is a diagram of amplitude versus frequency corresponding to the baseband spectrum of a Nyquist pulse used in conventional pulse amplitude modulated data transmission systems.

FIG. 1 shows the baseband spectrum of a pulse used in pulse amplitude modulated data transmission systems to have a frequency interval from 0 to $(1/T)-F_o$ in which amplitude has a constant value $A_o$ and an adjoining roll-off interval from $(1/T)-F_o$ to $F_o$ in which amplitude decreases to zero smoothly and symmetrically with respect to the midpoint whose frequency and amplitude coordinates are $1/(2T)$ and $A_o/2$, respectively. Excess bandwidth as discussed above is represented by the interval from $1/(2T)$ to $F_o$.

Figure 2:
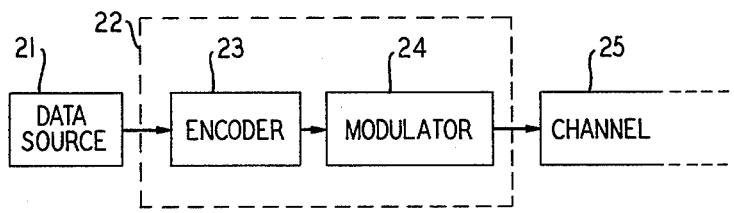
FIG. 2 schematically shows general features of a transmission system.

FIG. 2 shows components as are typically present in a data communications transmission system, namely data source 21, transmitter 22 consisting of encoder 23 and modulator 24, and channel 25. Typically, data produced by data source 21 are multi-level rectangular electrical pulses which, in the simplest case, are binary signals. More generally, data signals may have $2^L$ distinct levels, L being a small number such as, e.g., 2, 3, or 4. Data may represent letters or real numbers and may have been obtained by sampling an analog signal. Description of the invention is most convenient in terms of baseband signals, in which case the function of modulator 24 is merely to produce baseband limited pulses whose amplitude is proportional to signals produced by encoder 23. It is understood, however, that in practice an additional step of translation to a passband frequency interval is involved.

Figure 3:
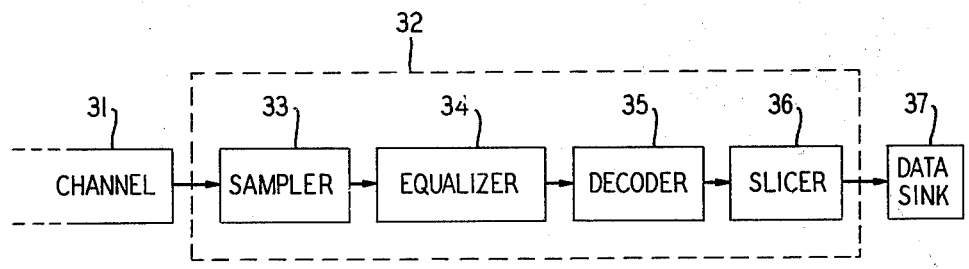
FIG. 3 schematically shows general features of a receiving system.

FIG. 3 shows components as are typically present in a data communications receiving system, namely transmission channel 31, receiver 32 consisting of sampler 33, equalizer 34, decoder 35, and slicer 36, and data sink 37. Equalizer 34 may be, e.g., a tapped delay line or a digitalized transversal filter as disclosed in U.S. Pat. No. 3,315,171 (F. K. Becker).

Figure 4:
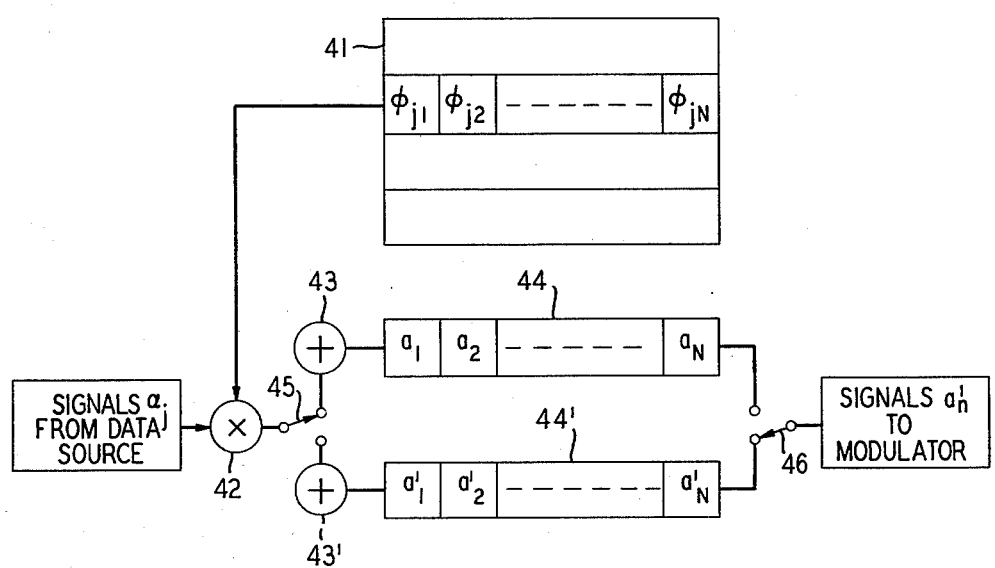
FIG. 4 schematically shows general features of an encoder for use in a transmission system according to the invention.

FIG. 4 shows components of an encoder comprising read-only memory 41, multiplication unit 42, adding units 43 and 43', accumulators 44 and 44', and switches 45 and 46. Signals $\alpha_j$ arrive from a data source, numbering of signals conveniently being taken modulo an integer number $\nu$ which defines block length. Memory 41 holds a $\nu$ by N array of entries $\phi_{j,n}$, where j runs from 1 to $\nu$ and n from 1 to N. For any j from 1 to $\nu$, multiplication unit 42 is capable of simultaneously multiplying all N entries $\phi_{j,n}$ (n from 1 to N) by a data item $\alpha_j$. Depending on the position of switch 45 the resulting products are added by adding units 43 or 43' to accumulators 44 or 44', respectively. Upon completion of the $\nu$-th additions, accumulators 44 or 44' contain items $a_n$ and $a_n'$, n from 1 to N, which represent signals encoded according to the invention. Switch 46 is synchronized with switch 45 to allow transmission of the contents of accumulators 44' while additions are made as shown to accumulators 44 and vice-versa. Each time switches 45 and 46 change position, accumulators 44 or 44' about to be connected to multiplication unit 42 are reset to zero. As a result of computations involving $\alpha$'s and $\phi$'s as described, each sequence ($a_n$, n from 1 to N), is a linear combination of sequences ($\phi_{j,n}$, n from 1 to N), and associated multipliers $\alpha_j$.

Design of multiplication unit 42 may take advantage of the limited number of levels of signals $\alpha_j$. E.g., in the case of binary signals $\alpha_1=1$ and $\alpha_2=-1$, multiplications are dispensable entirely and unit 42 functions merely to associate a sign.

Figure 5:
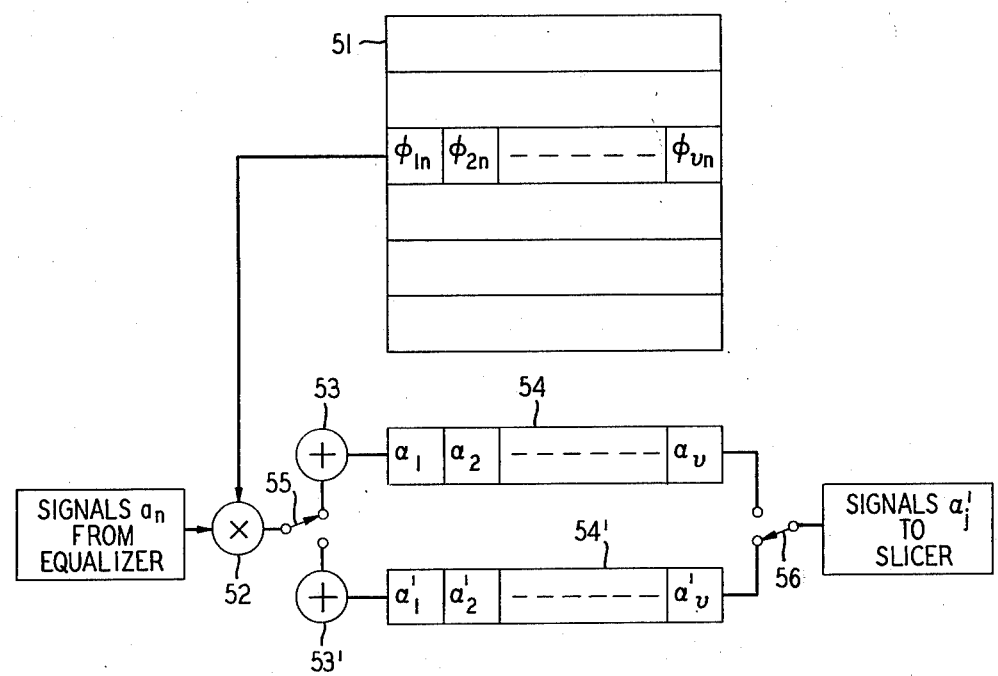
FIG. 5 schematically shows general features of a decoder for use in a receiving system according to the invention.

FIG. 5 shows components of a decoder as may be used as a counterpart to the encoder shown in FIG. 4. Signals $a_n$ arrive, e.g., from an equalizer, numbering of signals conveniently being taken modulo N. The decoder comprises read-only memory 51, multiplication unit 52, adding units 53 and 53', accumulators 54 and 54', and switches 55 and 56. Memory 51 holds an N by $\nu$ array of entries $\phi_{j,n}$, where j runs from 1 to $\nu$ and n from 1 to N. Multiplication unit 52 is capable of simultaneously multiplying, for any n from 1 to N, all $\nu$ entires $\phi_{j,n}$ (j from 1 to $\nu$) by a data signal $a_n$. Depending on the position of switch 55, the resulting $\nu$ products are added by adding units 53 or 53' to accumulators 54 or 54', respectively. Upon completion of the N-th additions, accumulators 54 or 54' contain items $\alpha_j$ or $\alpha'_j$, j from 1 to $\nu$, which represent signals decoded according to the invention. Switch 56 is synchronized with switch 55 to allow transmission of the contents of accumulators 54' while additions are made as shown to accumulators 54 and vice-versa. Each time switches 55 and 56 change position, accumulators 54 or 54' about to be connected to multiplication unit 52 are reset to zero. As a result of computations involving $a$'s and $\phi$'s as described, each sequence ($\alpha_j$, j from 1 to $\nu$) is a linear combination of sequences ($\phi_{j,n}$, j from 1 to $\nu$) and associated multipliers $a_n$.

It is noted that, while signals denoted $a_n$ in the descriptions of FIGS. 4 and 5 above are ideally the same, signals $a_n$ of FIG. 5 will differ in practice from signals $a_n$ of FIG. 4 due to distortion suffered in the course of transmission. For the sake of simplicity of description, such difference is not reflected in the notation. Similarly, signals $\alpha_j$ obtained upon decoding are different from original data signals $\alpha_j$ and, in particular, have to undergo a so-called slicing operation which results in the recovery of discrete levels. A detailed description of circuitry designed for slicing is given in U.S. Pat. No. 2,537,843 (issued Jan. 9, 1951 to L. A. Meacham, "Pulse Regeneration Apparatus").

Computations described above may be carried out by digital circuitry implementing multiplication units 42 and 52 and adding units 43, 43', 53, and 53'. Alternately, such units may be implemented by analog devices such as e.g., variable gain and operational amplifiers, choice of devices being influenced by practical considerations based, e.g., on data type and physical implementation of read-only memories 41 and 51.

In the following, F denotes the bandwidth as available or desired for the transmission of data signals having $2^L$ levels. Thus, ideally, bit rate is as high as 2FL. It is an aim of the invention to encode signals so as to allow transmission at a rate ρ only slightly less than such ideal rate.

According to the invention, entries $\phi_{j,n}$ in read-only memories 41 and 51 are determined as follows: for any integer number N, N discrete prolate spheroidal sequences (DPSS's for short), each consisting of N numbers, may be defined as a function of a parameter which is a number greater than 0 and less than $\frac{1}{2}$. This parameter is denoted by W and is related to time interval T and bandwidth F by the relationship W=FT. Typically, bandwidth F is a given characteristic of a transmission channel and T and W are chosen such that W is less than $\frac{1}{2}$. The smaller T, the easier the realization of pulses suitable for pulse amplitude modulation by encoded signals, but the greater also the rate of doing arithmetic required for encoding and decoding. In terms of N and W, a set of DPSS's is defined as a set of orthonormal eigenvectors of the N by N matrix whose (m,n)-entry is $\gamma(m,n) = \sin(2\pi W(n-m))/\pi(n-m)$. In the following, this N by N matrix is denoted by K. It can be shown that the N eigenvalues of the matrix K all lie in the interval from 0 to 1 and that their sum equals 2WN. In fact, when N is sufficiently large, approximately 2WN of these eigenvalues are approximately equal to 1 and the remainder are approximately equal to zero. According to the invention, the number $\nu$ is preferably chosen about equal to the number of eigenvalues which are approximately equal to 1 and the eigenvectors associated with such eigenvalues are chosen as the desired DPSS's in terms of which given data signals are encoded by linear combination as described above.

If, for the sake of convenience, eigenvalues $\lambda_j$ are numbered in decreasing order, $\nu$ is preferably chosen as large as possible subject to the condition that $\lambda_j$ (j from 1 to $\nu$) to close to 1. More specifically, $\nu$ may be chosen subject to the condition that the value of the expression $Q = \Sigma(1-\lambda_j)/\nu$ be less than a suitably small threshold such as, e.g., $10^{-4}$. The significance of such test lies in that error introduced into a signal due to encoding may generally be bounded in terms of Q and that, as a consequence, Q should preferably be small.

Pulses used for pulse amplitude modulation may be Nyquist pulses or, more generally, any pulses whose baseband spectrum is such that at frequencies less than or equal to F, amplitude is essentially equal to T and at frequencies greater than 1/T−F, amplitude is essentially zero. What is required for frequencies in the roll-off interval from F to 1/T−F is merely that amplitude not exceed a finite bound such as, e.g., T. Thus, in particular, roll-off need be neither smooth nor symmetrical.

The invention, described above in terms of encoding data signals and transmitting the encoded signals by modulating conventional pulses, may be interpreted alternately as a method of transmitting data signals by modulating specially tailored waveforms. In particular, each $\alpha_j$ modulates a waveform $g_j$ and the transmitted signal is an additive superposition of the resulting waveforms.

Whether viewed as produced by encoding followed by amplitude modulation of conventional pulses or by amplitude modulation of specially selected waveforms, the resulting baseband signal may be converted into a passband signal by standard methods such as, e.g., vestigial sideband modulation or quadrature amplitude modulation. The latter, in particular, may be conveniently used to translate two independent baseband signals x(t) and y(t) into a passband signal z(t) having frequencies in the frequency interval from $F_1$ to $F_2$ by means of the following procedure: set $F = (F_2-F_1)/2$, choose T less than $\frac{1}{2}$F, define $F_c = (F_1+F_2)/2$, and form $z(t) = x(t) \cos 2\pi F_c t + y(t) \sin 2\pi F_c t$.

Recovery of original signals x(t) and y(tj) from z(t) may be by so-called homodyne demodulation as described on page 178 of the book by Lucky et al. cited above. Since demodulation requires knowledge of carrier phase and frequency by the receiver, such information is preferably transmitted to the receiver, e.g., by means of a tone.

Instead of encoding data $\alpha_j$ in terms of baseband DPSS's as described above, it is alternately possible to use passband DPSS's which may be defined as follows: Instead of choosing a single parameter W as defined above, two parameters $W_1$ and $W_2$ are chosen such that $W_1$ is less than $W_2$ and such that $W_1$ and $W_2$ lie in the interval from 0 to $\frac{1}{2}$. Elements $\gamma(m,n)$ of a matrix K are defined by $\gamma(m,n) = (2/\pi k) \cos(\pi(W_2+W_1)k) \sin(\pi(W_2-W_1)k)$, where $k = n-m$. Passband DPSS's are obtained as eigenvectors of the matrix K as described above.

Use of passband DPSS's allows the direct generation of passband signals which do not require transformation from baseband to passband. Alternatively, encoding in terms of passband DPSS's may be used in combination with an additional transformation in order to reserve a narrow frequency range for the transmission of one or several tones at frequencies near the midpoint of the passband. This may be achieved, e.g., by quadrature amplitude modulation of a signal encoded in terms of passband DPSS's.

While DPSS's are defined as eigenvectors normalized to Euclidean length 1, use of sequences which are normalized differently is also within the scope of the invention. It is evident that encoding data in terms of sequences obtained by multiplying DPSS's by a nonzero scalar c is equivalent to multiplying data signals by c followed by encoding in terms of DPSS's. Correspondingly, decoding by means of sequences obtained by dividing DPSS's by c is also within the scope of the invention.

Encoding and decoding according to the invention may also be compatible with other encoding schemes and, consequently may be used in combination. For example, the new technique may be used in combination with error correction and detection codes based on appending check sums to data blocks.

Numerical computation of the desired eigenvectors and eigenvalues of the matrix K may be carried out by any of a number of standard methods of computational linear algebra such as, e.g., methods associated with the names of Jacobi, Givens, Householder, and Francis and as described, e.g., by J. H. Wilkinson, "The Algebraic Eigenvalue Problem", Clarendon Press, 1965. Programs implementing these algorithms are given by C. Reinsch et al., "Linear Algebra", Springer, 1971 and may also be conveniently available in the form of library subroutines on scientific computing equipment. For the sake of illustration, Table 1 shows 3-digit approximations of eigenvalues $\lambda_j$ computed for the case $N = 50$ and $W = \frac{1}{4}$. Inspection of Table 1 allows verification that, since $2WN = N/2$ in this case, about half of the $\lambda_j$'s are about equal to 1 and the remainder about equal to zero.

TABLE 1

| j | $\lambda_j$ |
|---|---|
| 1–21 | greater than 0.9997 |

TABLE 1-continued

| j | $\lambda_j$ |
|---|---|
| 22 | 0.998 |
| 23 | 0.985 |
| 24 | 0.914 |
| 25 | 0.680 |
| 26 | 0.320 |
| 27 | 0.086 |
| 28 | 0.015 |
| 29 | 0.002 |
| 30–50 | less than 0.00023 |

Calculations involving $\alpha$'s, $\phi$'s, and a's may be conveniently carried out in fixed or floating point arithmetic. It is understood that, in practice, finite precision values $\phi_{j,n}$ merely approximate the elements of DPSS's, quality of the approximation being dependent on precision used in the computation of $\phi$'s as well as on precision used for their representation in read-only memory. Furthermore, accuracy of encoded sequences obtained by encoding in terms of $\phi$'s depends on the accuracy of arithmetic used in carrying out computations described above. While 10-bit accuracy may generally be sufficient for encoding and decoding, and while even greater accuracy may be desirable, lesser accuracy is not precluded.

For the computation of elements $\phi_{j,n}$ of DPSS's for N up to about 100 by means of a numerically stable implementation of one of the algorithms mentioned above, single precision floating point arithmetic may be sufficient as available on scientific data processing equipment.

The following example illustrates the efficacy of the disclosed method for minimizing excess bandwidth.

EXAMPLE

Transmissions of $2^L$-level signals results in a bit rate over the channel of $\rho = (\nu/N)(L/T)$ and a bandwidth of $F = W/T = (\rho/2L)(2WN/\nu)$. If $W = 0.415$, $N = 80$, and $\nu = 64$, then the ratio $2WN/\nu = 1.0375$, which implies that bandwidth required in excess of the ideal bandwidth of $\rho/2L$ is a mere 3.75 percent.

If $1/T = 6 \times 10^3$ per second, $F = 2490$ Hz, and $L = 2$, then rho $= 9.6 \times 10^3$ bits/second. For the sake of comparison, this bandwidth F may be contrasted with a bandwidth of 2686 Hz required to transmit the same signals at the same rate by prior art direct modulation of Nyquist pulses and allowing for 12 percent excess bandwidth.

I claim:

1. Method for transmitting data signals, here designated as first, comprising the steps of
    (1) encoding a first block of $\nu$ of said first signals into a second block of N encoded signals, N being greater than $\nu$, said second block being a linear combination of $\nu$ characteristic sequences, said linear combination being defined by said first data signals of said first block, and said characteristic sequences being approximations of discrete prolate spheroidal sequences or of a nonzero multiple of discrete prolate spheroidal sequences, and
    (2) modulating the amplitude of pulses by said encoded signals.
2. A data transmitter comprising
    (1) connection means to a source of data signals, here designated as first,
    (2) an encoder comprising transformation means for transforming a first block of $\nu$ of said signals into a second block of N encoded signals, N being greater than $\nu$, said second block being a linear combination of $\nu$ characteristic sequences, said linear combination being defined by said first signals of said first block, and said characteristic sequences being approximations of discrete prolate spheroidal sequences or of a nonzero multiple of discrete prolate spheroidal sequences,
    (3) a pulse amplitude modulator connected to said encoder, and
    (4) connection means to a communications channel.
3. Method of claim 1 or transmitter of claim 2 in which said characteristic sequences are finite precision approximations of baseband discrete prolate spheroidal sequences which are defined as orthonormal eigenvectors of the N by N matrix whose (m,n)-element is sin $(2\pi W(n-m))/\pi(m-n)$, W being a number which is greater than zero and less than $\frac{1}{2}$.
4. Method of claim 1 or transmitter of claim 2 in which said characteristic sequences are finite precision approximations of passband discrete prolate spheroidal sequences which are defined as orthonormal eigenvectors of the N by N matrix whose (m,n) element is $(2/\pi k)\cos(\pi(W_2+W_1)k)\sin(\pi(W_2-W_1)k)$, k being equal to $n-m$, and $W_1$ and $W_2$ being numbers which are greater than zero and less than $\frac{1}{2}$ and such that $W_1$ is less than $W_2$.
5. Method of transmitter of claim 4 in which quadrature amplitude modulation is applied to said encoded signals.
6. Method or transmitter of claim 5 in which at least one tone is transmitted at a frequency near the midpoint of the passband frequency interval.
7. Method or transmitter of claim 3 in which said eigenvectors are associated with eigenvalues $\lambda_j$ of said N by N matrix which are close to 1.
8. Method or transmitter of claim 7 in which $\nu$ is chosen as large as possible subject to the condition that the value of the expression $\Sigma(1-\lambda_j)/\nu$ be close to zero.
9. Method or transmitter of claim 8 in which said value is less than $10^{-4}$.
10. Method of claim 1 in which said pulses have a baseband frequency spectrum such that amplitude is essentially constant for frequencies in a first interval from zero to a first frequency which is greater than zero, such that amplitude is bounded by a finite constant in a second interval from said first frequency to a second frequency which is greater than said first frequency, and such that amplitude is essentially zero for frequencies greater than said second frequency.
11. Method of claim 10 in which said finite constant is equal to amplitude in said first interval.
12. Method of claim 11 in which said pulses are Nyquist pulses.
13. Method of claim 1 or device of claim 2 in which said first signals represent letters or real numbers.
14. Method or device of claim 13 in which said numbers represent amplitude of an analog signal at sample points.
15. A receiver for receiving pulse amplitude modulated signals, here designated as first, comprising
    (1) connection means to a band-limited communications channel,
    (2) a decoder comprising transformation means for transforming a first block of N of said first signals into a second block of $\nu$ decoded signals, N being greater than $\nu$, said first signals of said first block being numbered from $n=1$ to $n=N$ and said decoded signals of said second block being numbered from $j=1$ to $j=\nu$, said second block being a linear combination of N characteristic sequences, said linear combination being defined by said first signals of said first block, and the j-th element of the n-th of said characteristic sequences being the n-th component of the j-th member of a set of approximations of discrete prolate spheroidal sequences or of a nonzero multiple of discrete prolate spheroidal sequences, and (3) connection means to a data sink.

16. Method for transmitting amplitude modulated pulses over a communications channel, amplitudes of at least one block, here designated second, of N of said pulses being modulated by N encoded signals, said encoded signals having been obtained by encoding a block, here designated first, of $\nu$ data signals, N being greater than $\nu$, said second block being a linear combination of $\nu$ characteristic sequences, said linear combination being defined by said data signals of said first block, and said characteristic sequences being approximations of discrete prolate spheroidal sequences or of a nonzero multiple of discrete prolate spheroidal sequences, said method comprising allocation of bandwidth to said channel so that allocated bandwidth exceeds Nyquist bandwidth by less than 10 percent.

* * * * *